(12) United States Patent
Xu (10) Patent No.: US 11,860,222 B2
(45) Date of Patent: Jan. 2, 2024

(54) METHOD, CIRCUIT AND APPARATUS FOR TESTING CROSSTALK EFFECT

(71) Applicant: CHANGXIN MEMORY TECHNOLOGIES, INC., Hefei (CN)

(72) Inventor: Fan Xu, Hefei (CN)

(73) Assignee: CHANGXIN MEMORY TECHNOLOGIES, INC., Hefei (CN)

( * ) Notice: Subject to any disclaimer, the term of this patent is extended or adjusted under 35 U.S.C. 154(b) by 161 days.

(21) Appl. No.: 17/449,532

(22) Filed: Sep. 30, 2021

(65) Prior Publication Data

US 2022/0268832 A1    Aug. 25, 2022

Related U.S. Application Data

(63) Continuation of application No. PCT/CN2021/105273, filed on Jul. 8, 2021.

(30) Foreign Application Priority Data

Feb. 25, 2021    (CN) .......................... 202110210378.4

(51) Int. Cl.
*G01R 31/28*    (2006.01)
*H04B 3/487*    (2015.01)

(52) U.S. Cl.
CPC ......... *G01R 31/2884* (2013.01); *H04B 3/487* (2015.01)

(58) Field of Classification Search
CPC .......... G01R 31/2884; G01R 31/31708; H04B 3/487; G06F 30/398; G06F 30/367; G06F 2119/10
USPC .................... 324/628, 627, 612, 600
See application file for complete search history.

(56) References Cited

U.S. PATENT DOCUMENTS

| | | | | |
|---|---|---|---|---|
| 5,502,391 A | * | 3/1996 | Sciacero | G01R 31/58 324/684 |
| 6,198,292 B1 | * | 3/2001 | Kirk | H04B 3/487 702/117 |
| 6,259,258 B1 | * | 7/2001 | Cook | H04B 3/487 324/628 |
| 6,507,935 B1 | | 1/2003 | Aingaran | |
| 6,536,022 B1 | | 3/2003 | Aingaran | |
| 10,200,085 B1 | * | 2/2019 | Gines | H04B 3/487 |

(Continued)

FOREIGN PATENT DOCUMENTS

| CN | 1484294 A | 3/2004 |
|---|---|---|
| CN | 106066914 B | 5/2019 |

(Continued)

*Primary Examiner* — Giovanni Astacio-Oquendo
(74) *Attorney, Agent, or Firm* — Syncoda LLC; Feng Ma (57) ABSTRACT

A method for testing crosstalk effect includes: obtaining a test signal and an interference input signal; inputting the test signal into a crosstalk effect test circuit obtained by simulation, so as to obtain an interfered signal; and when a rise time of the interfered signal or a fall time of the interfered signal is greater than a preset time threshold, determining that an excessive crosstalk effect exists in an integrated circuit under test. The crosstalk effect test circuit includes a first circuit, N second circuits, and N capacitors. The first circuit is configured to simulate an interfered first signal circuit in the integrated circuit under test; the N second circuits are configured to simulate N second signal circuits that interfere with the first signal circuit in the integrated circuit under test.

15 Claims, 7 Drawing Sheets

(56) References Cited

U.S. PATENT DOCUMENTS

2013/0010931 A1* 1/2013 Berg .................. H04M 3/304
 379/22
2019/0305819 A1* 10/2019 Jeong .................. H04B 3/462

FOREIGN PATENT DOCUMENTS

| CN | 110717310 A | 1/2020 |
| CN | 110912557 A | 3/2020 |
| CN | 113030609 A | 6/2021 |

* cited by examiner

METHOD, CIRCUIT AND APPARATUS FOR TESTING CROSSTALK EFFECT

CROSS-REFERENCE TO RELATED APPLICATIONS

This is a continuation of International Patent Application No. PCT/CN2021/105273 filed on Jul. 8, 2021, which claims priority to Chinese Patent Application No. 202110210378.4 filed on Feb. 25, 2021. The disclosures of these applications are hereby incorporated by reference in their entirety.

BACKGROUND

In electronics, a crosstalk effect refers to a coupling effect between two signal lines. That is, inductive and capacitive coupling occurs between two signal lines that are adjacent to each other in spatial distance, thereby causing mutual interference between the two signal lines. In recent years, with the development of integrated circuits, metal layers of integrated circuits have increased, line widths have decreased, and circuit densities have increased, such that the crosstalk effect of the integrated circuits is more and more serious, ultimately affecting the quality of the output signals of the integrated circuits.

SUMMARY

The present disclosure relates to an integrated circuit technology, and more particularly to a method, a circuit and an apparatus for testing crosstalk effect.

The present disclosure provides a method, a circuit and an apparatus for testing crosstalk effect, being configured to test a crosstalk effect of an integrated circuit.

In one aspect, the present disclosure provides a method for testing crosstalk effect, including the following steps: a test signal and an interference input signal are obtained; the test signal and the interference input signal are inputted into a crosstalk effect test circuit obtained by simulation, so as to obtain an interfered signal. The crosstalk effect test circuit includes a first circuit, N second circuits, and N capacitors. The first circuit is configured to simulate an interfered first signal circuit in an integrated circuit under test, an input end of the first circuit is configured to receive the test signal, and an output end of the first circuit is configured to output the interfered signal. The N second circuits are configured to simulate N second signal circuits that interfere with the first signal circuit in the integrated circuit under test, N is an integer greater than 0, an input end of each second circuit is configured to receive the interference input signal, and an output end of each second circuit is configured to output an interference signal.

In another aspect, the present disclosure provides a circuit for testing crosstalk effect, including a first circuit, N second circuits, and N capacitors. The first circuit is configured to simulate an interfered first signal circuit in a integrated circuit under test, an input end of the first circuit is configured to receive a test signal, and an output end of the first circuit is configured to output an interfered signal. The N second circuits are configured to simulate N second signal circuits that interfere with the first signal circuit in the integrated circuit under test, N is an integer greater than 0, an input end of each second circuit is configured to receive an interference input signal, and an output end of each second circuit is configured to output an interference signal. One pole plate of each of the N capacitors is connected to the first circuit, the other pole plate of the capacitor is connected to the second circuit, and a capacitance value of the capacitor is determined according to a measured coupling capacitance value between the second signal circuit and the first signal circuit.

In another aspect, the present disclosure provides an apparatus for testing crosstalk effect, including an obtaining module, an inputting module, and a processing module. The obtaining module is configured to obtain a test signal and an interference input signal. The inputting module is configured to input the test signal and the interference input signal into a crosstalk effect test circuit obtained by simulation, so as to obtain an interfered signal. The crosstalk effect test circuit includes a first circuit, N second circuits, and N capacitors. The first circuit is configured to simulate an interfered first signal circuit in an integrated circuit under test, an input end of the first circuit is configured to receive the test signal, and an output end of the first circuit is configured to output the interfered signal. The N second circuits are configured to simulate N second signal circuits that interfere with the first signal circuit in the integrated circuit under test, N is an integer greater than 0, an input end of each second circuit is configured to receive the interference input signal, and an output end of each second circuit is configured to output an interference signal. One pole plate of each of the N capacitors is connected to the first circuit, the other pole plate of the capacitor is connected to the second circuit, and a capacitance value of the capacitor is determined according to a measured coupling capacitance value between the second signal circuit and the first signal circuit. The processing module is configured to determine that an excessive crosstalk effect exists in the integrated circuit under test when a rise time of the interfered signal or a fall time of the interfered signal is greater than a preset time threshold.

In another aspect, the present disclosure provides a terminal device, including a memory, a processor, and a transceiver. The memory is configured to store an instruction; the transceiver is configured to communicate with other devices, and the processor is configured to execute the instruction stored in the memory, such that the terminal device executes the method for testing crosstalk effect in a first aspect.

In another aspect, the present disclosure provides a computer-readable storage medium. The computer-readable storage medium stores a computer executable instruction, and when the instruction is executed, a computer executes the method for testing crosstalk effect in the first aspect.

In another aspect, the present disclosure provides a computer program product, including a computer program. When the computer program is executed by a processor, the method for testing crosstalk effect in the first aspect is implemented.

DETAILED DESCRIPTION

Exemplary embodiments will be described here in detail, and examples thereof are represented in the accompanying drawings. When the following description relates to the accompanying drawings, unless otherwise indicated, the same numbers in different accompanying drawings represent the same or similar elements. The implementations described in the following exemplary embodiments do not represent all implementations consistent with the disclosure. On the contrary, they are merely examples of apparatuses and methods consistent with some aspects of the disclosure as detailed in the appended claims.

An influence of the crosstalk effect on the performance of the circuit can be estimated based on post-layout simulation in the design process of the integrated circuit. The post-layout simulation includes extracting parasitic parameters and adding the parasitic parameters into simulation. However, in fact, the influence of the crosstalk effect is related to the magnitude of parasitic capacitance and is also related to an input test case. The input test case is different, and a final result is also different. At present, the test cases of the integrated circuit subjected to the post-layout simulation cannot fully include all the application scenarios. In addition, even if the test cases can fully include all the application scenarios, the scale of a full-chip post-layout simulation net-list (RCC SPF) including a parasitic coupling capacitor is very large (greater than 20 G), a simulation time is very long, and thus, from the time point of view, an actual project requirement cannot be met. In addition, a pulse signal outputted through a full-chip layout is affected by the crosstalk effect, and may also be affected by other factors.

Various embodiments of the present disclosure can address how to test the crosstalk effect of the integrated circuit.

In recent years, with the development of integrated circuits, metal layers of the integrated circuits have increased, line widths have decreased, and circuit densities have increased, such that a crosstalk effect of the integrated circuits is more and more serious, ultimately affecting the quality of output signals of the integrated circuits. In order to improve the quality of the output signals of the integrated circuits, it is necessary to analyze and overcome the crosstalk effect of the integrated circuits.

Based on this, a researcher estimates an influence of the crosstalk effect on the performance of the circuit by performing post-layout simulation on the integrated circuit through software in the design process of the integrated circuit. The post-layout simulation includes extracting parasitic parameters and adding the parasitic parameters into simulation. However, in fact, the influence of the crosstalk effect is related to the magnitude of parasitic capacitance and is also related to an input test case. The input test case is different, and a final result is also different. At present, the test cases of the integrated circuit subjected to the post-layout simulation cannot fully include all the application scenarios. In addition, even if the test cases can fully include all the application scenarios, the scale of a full-chip post-layout simulation net-list (RCC SPF) including a parasitic coupling capacitor is very large (greater than 20 G), a simulation time is very long, and thus, from a time point of view, an actual project requirement cannot be met. In addition, a pulse signal outputted through a full-chip layout is affected by the crosstalk effect, and can also be affected by other factors.

As such, the following three problems may exist when testing the crosstalk effect of the integrated circuit.

(1) Existing parasitic parameters extracted by post-layout simulation are comprehensive and further include other parasitic parameters besides the crosstalk effect.

(2) The crosstalk effect is related to the test case, i.e., the phase of an interference signal is different from that of an interfered signal, and a rise time and a fall time of the interference signal are different, which will cause the rise time and the fall time of the interfered signal to be different. It is impossible to cover all test cases. Therefore, the present disclosure simulates the case of a maximum interference effect according to an actual project condition.

(3) Because the parasitic parameters extracted by post-layout simulation are comprehensive, the scale of a net-list of post-layout simulation is very large, resulting in a very long simulation time, and it is not beneficial for the process of design.

Based on this, the present disclosure provides an accurate and efficient method, circuit and apparatus for testing crosstalk effect, being suitable for actual project design and development. The crosstalk effect test circuit that is created according to the method for testing crosstalk effect can only simulate a crosstalk environment where an integrated circuit under test is actually located, and eliminate the influences of other parasitic parameters in the integrated circuit under test. A test signal is inputted to the crosstalk effect test circuit and then an interfered signal is obtained. The interfered signal can only reflect a change when the test signal is affected by the crosstalk effect. A terminal device can accurately determine the crosstalk effect of the integrated circuit under test through the interfered signal.

Figure 1:
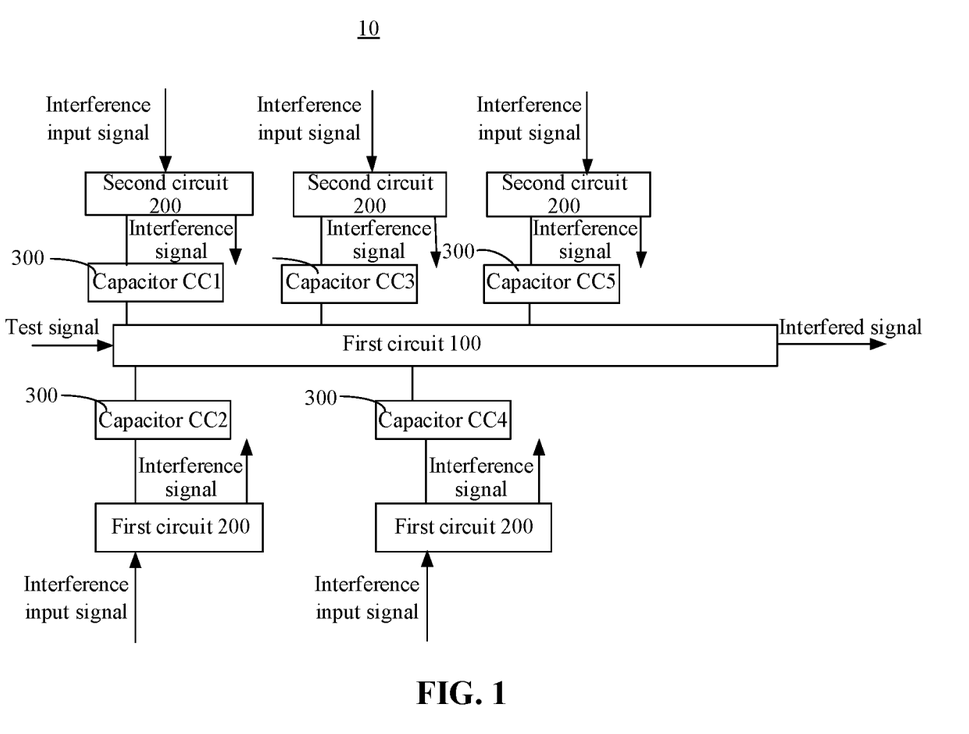
FIG. 1 is a schematic view of a crosstalk effect test circuit provided by embodiment I of the present disclosure.

Referring to FIG. 1, embodiment I of the present disclosure provides a crosstalk effect test circuit 10, including a first circuit 100, N second circuits 200, and N capacitors 300. N is an integer greater than 0.

As shown in FIG. 1, the first circuit 100 is configured to simulate an interfered first signal circuit in the integrated circuit under test, and the N second circuits 200 are configured to simulate N second signal circuits that interfere with the first signal circuit in the integrated circuit under test. The second signal circuit is a signal circuit that has a crosstalk effect interference with the first signal circuit. The crosstalk effect occurs between the signals having the same wiring direction. The closer the two signal lines are, the greater the crosstalk effect between the two signal lines. Therefore, the second signal circuit is a signal line having the same wiring direction as the first signal circuit and adjacent to the first signal circuit. The number of the second signal circuits can be selected according to an actual requirement. Optionally, the second signal circuits can be the first five signal circuits that are likely to cause greater interference with the first signal circuit.

The N second signal circuits are N signal circuits that have relatively large interference and are extracted from all the signal circuits interfering with the first signal circuit. The selection of the second signal circuit is related to a coupling capacitance value between each signal circuit and the first signal circuit. Optionally, the coupling capacitance value between the second signal circuit and the first signal circuit exceeds a preset capacitance value. The preset capacitance value can be set by a researcher according to an actual condition. Optionally, the coupling capacitance values between different signal circuits and the first signal circuit can be extracted by a layout parasitic effect extraction tool, for example, extracting the coupling capacitance value by Star-RC software.

Many coupling capacitors and many interference circuits (the second signal circuits) exist in the integrated circuit under test, and cannot be fully simulated in the crosstalk effect test circuit. The more carefully the crosstalk effect test circuit simulates the integrated circuit under test, the more accurate an obtained crosstalk effect test result of the integrated circuit under test is, and the higher the accuracy of a correspondingly obtained interfered signal is. However, this also consumes a lot of simulation test time. Therefore, the present disclosure selects to place the coupling capacitor having the greatest influence on the first signal circuit in the crosstalk effect test circuit, so as to balance test accuracy and a test time.

Specifically, the N capacitors 300 simulate the coupling capacitors between the first signal circuit and the N second signal circuits. In the crosstalk effect test circuit 10, one pole plate of the capacitor 300 is connected to the first circuit 100, the other pole plate of the capacitor 300 is connected to the second circuit 200, and a capacitance value of the capacitor is determined according to an extracted coupling capacitance value between the second signal circuit and the first signal circuit. As shown in FIG. 1, the N capacitors 300 respectively are capacitor CC1, capacitor CC2, capacitor CC3, capacitor CC4, and capacitor CC5 that are five simulated coupling capacitors between the second signal circuits and the first signal circuit. A capacitance value corresponding to the capacitor CC1 is a maximum capacitance value among the five coupling capacitors, and the capacitance values corresponding to the capacitor CC1, the capacitor CC2, the capacitor CC3, the capacitor CC4, and the capacitor CC5 are sequentially decreased.

An input end of the first circuit 100 is configured to receive the test signal. An input end of the second circuit 200 is configured to receive an interference input signal, and an output end of the second circuit is configured to output the interference signal. When the second circuit 200 has the inflow of the interference input signal, a tested signal is affected by the interference signal received by the capacitor 300 and then becomes the interfered signal. An output end of the first circuit outputs the interfered signal. The interfered signal can reflect the influence of the crosstalk effect on the test signal, and further reflects the influence of the crosstalk effect on the first signal circuit in the integrated circuit under test.

The crosstalk effect test circuit 10 provided by this embodiment can simulate the integrated circuit under test, and the coupling capacitor interfering with the first signal circuit in the integrated circuit under test is correspondingly provided on the capacitor 300 of the crosstalk effect test circuit 10, and the capacitor 300 connected between the first circuit 100 and the second circuit 200 is used to simulate an influence of the coupling capacitor on the first signal circuit. Hence, the crosstalk effect test circuit 10 only extracts the coupling capacitor and eliminates the influences of other parasitic parameters other than the crosstalk effect. In this way, the crosstalk effect determined by the interfered signal is more accurate. In addition, the crosstalk effect test circuit 10 does not need to occupy a lot of simulation time, which is also beneficial for the development of integrated circuit design.

Figure 2:
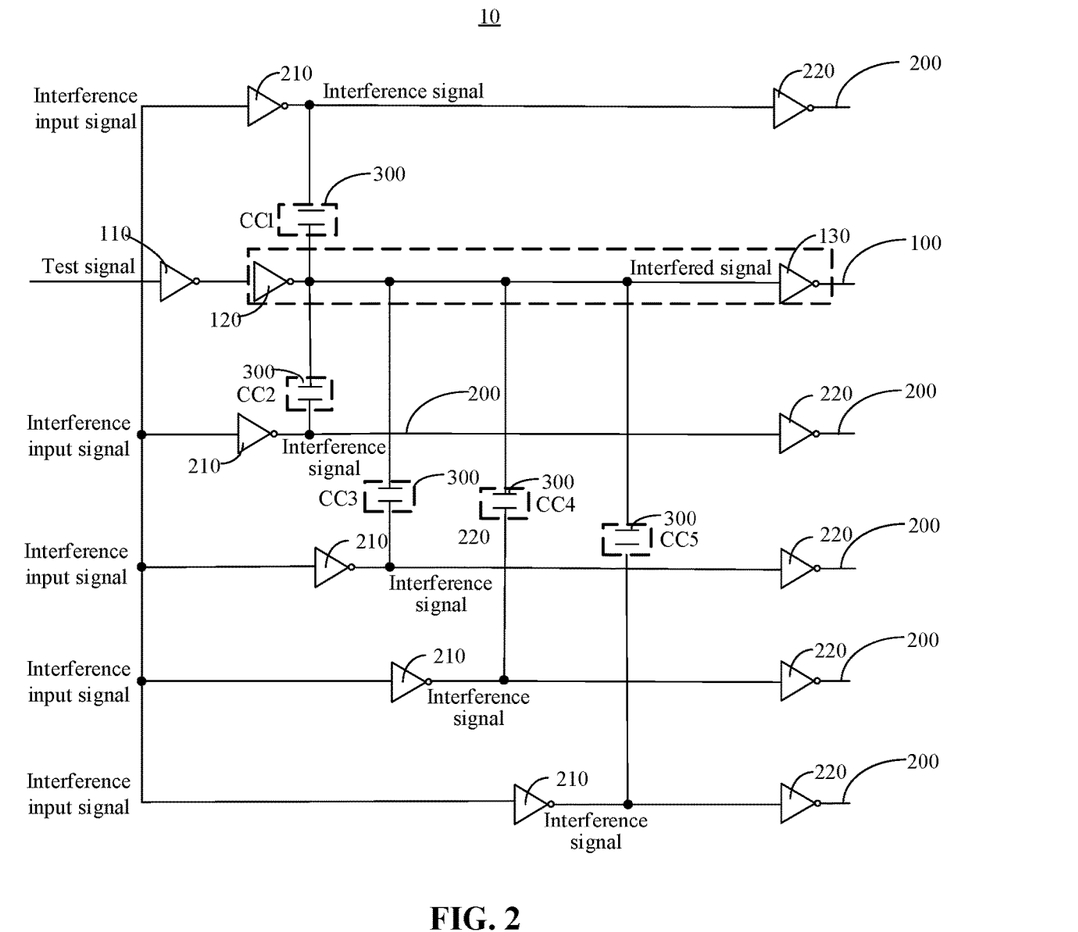
FIG. 2 is a schematic view of a crosstalk effect test circuit provided by embodiment II of the present disclosure.

Referring to FIG. 2, embodiment II provided by the present disclosure further describes the first circuit 100 and the second circuit 200 on the basis of embodiment I. The first circuit 100 includes an inverting unit 110, a first driving unit 120, and a first load unit 130. The second circuit 200 includes a second driving unit 210 and a second load unit 220.

An input end of the inverting unit 110 is configured to receive the test signal, perform inverting processing on the test signal and then output an inverted test signal. An input end of the first driving unit 120 is connected to an output end of the inverting unit 110, and an output end of the first driving unit 120 outputs the interfered signal. An input end of the first load unit 130 is connected to the output end of the first driving unit 120.

An input end of the second driving unit 210 is configured to receive the interference input signal, and an output end of the second driving unit 210 is configured to output the interference signal. An input end of the second load unit 220 is connected to the output end of the second driving unit 210.

One pole plate of the capacitor 300 is connected to the output end of the second driving unit 210 and connected to the input end of the second load unit 220, and the other pole plate of the capacitor 300 is connected to the first circuit 100. Specifically, the other pole plate of the capacitor 300 is connected to the output end of the first driving unit 120 and connected to the input end of the first load unit 130. As shown in FIG. 2, one pole plate of the capacitor CC1 is connected between the second driving unit 210 and the second load unit 220, and the other pole plate of the capacitor CC1 is connected between the first driving unit 120 and the first load unit 130.

The first circuit 100 includes the inverting unit 110, but the second circuit does not include the inverting unit. Therefore, when the test signal and the interference input signal are pulse signals of the same phase, the test signal is inputted into the first circuit 100, and the interference input signal is simultaneously inputted into the second circuit 200, the interfered signal is in inverted phase from the interference signal, and the crosstalk effect has the greatest influence on the rise time and the fall time of the interfered signal.

Optionally, the inverting unit 110 can be a typical inverter unit consisting of a core device in a process digital standard cell library. The inverting unit 110 has a main function of producing a test case of the crosstalk effect test circuit 10, i.e., the test case at the time of having a strongest crosstalk effect. The researcher can produce different test cases of the crosstalk effect test circuit 10 by adjusting the rise time and the fall time of the interference input signal. Optionally, the rise time and the fall time of the interference input signal both are a preset time period, i.e., 20 picoseconds (referred to as ps).

It is found through an experiment that when the rise time and the fall time of the interference input signal both are 20 ps, the interference signal outputted by the second driving unit has a shortest rise time and a shortest fall time, N interference signals almost act on the interfered signal at the same moment, and the interfered signal and the interference signal have the same frequency and are inverted, the interference signal has a strongest crosstalk effect on the interfered signal, and the rise time and the fall time of the obtained interfered signal are most affected by the crosstalk effect.

The crosstalk effect test circuit 10 provided by this embodiment can output the interfered signal at the time of having a greatest crosstalk effect, thereby helping the researcher to analyze the change of the output signal of the integrated circuit under test at the time of having the greatest crosstalk effect.

Figure 3:
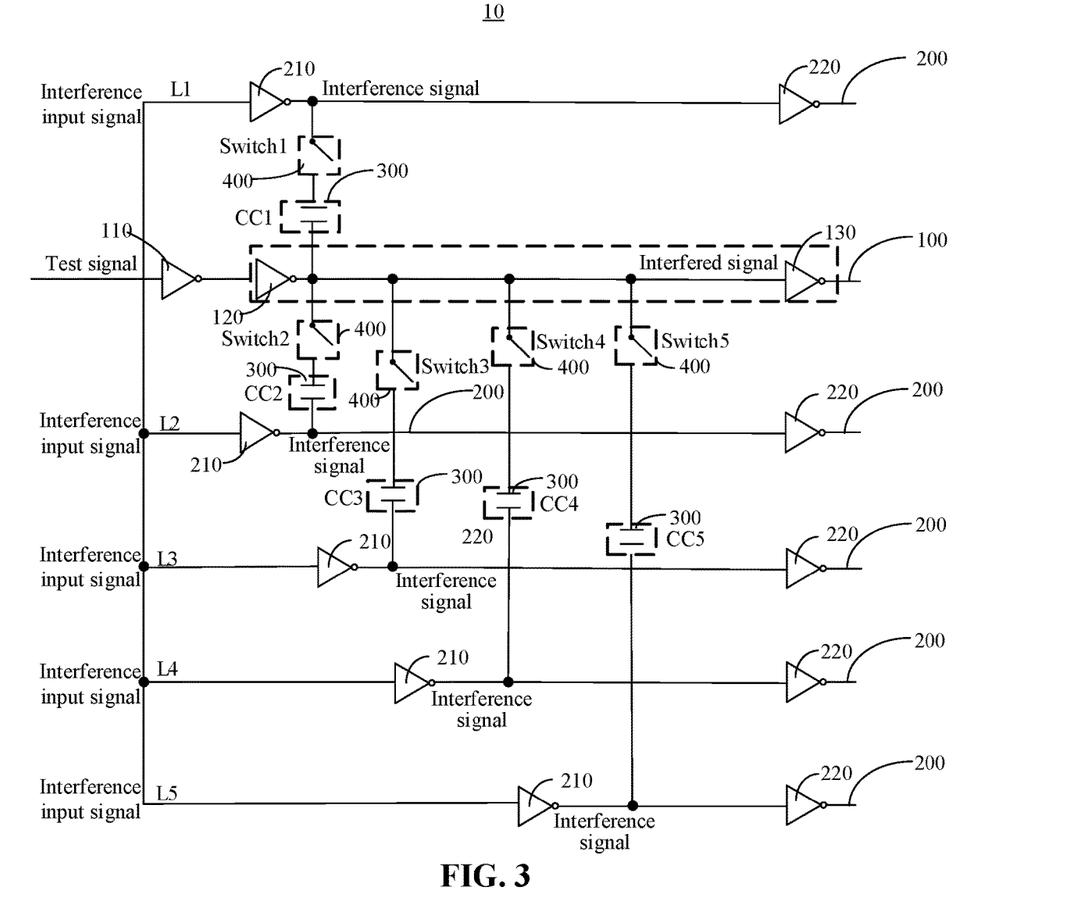
FIG. 3 is a schematic view of a crosstalk effect test circuit provided by embodiment III of the present disclosure.

Referring to FIG. 3, embodiment III of the present disclosure provides a crosstalk effect test circuit 10. A control switch 400 is added on the basis of the crosstalk effect test circuit 10 provided by embodiment I or embodiment II.

One end of the control switch 400 is connected to one pole plate of the capacitor 300, the other end of the control switch 400 is connected to the first circuit 100 or the second circuit 200, and the control switch 400 is connected in series to the capacitor 300. Optionally, the crosstalk effect test circuit 10 provided by this embodiment includes N control switches 400. The N control switches 400 are arranged corresponding to the N capacitors 300.

As shown in FIG. 3, one end of a control switch SwitcM is connected to the capacitor CC1, the other end of the control switch SwitcM is connected to a second circuit L1, and the second circuit L1 is the second circuit 200 connected to the capacitor CC1. Optionally, the other end of the control switch SwitcM can also be connected to the first circuit 100. One end of a control switch Switch2 is connected to the capacitor CC2, and the other end of the control switch Switch2 is connected to the first circuit 100. Optionally, the other end of the control switch Switch2 can also be connected to a second circuit L2. The second circuit L2 is the second circuit 200 connected to the capacitor CC2. By analogy, one end of a control switch Switch5 is connected to the capacitor CC5, and the other end of the control switch Switch5 is connected to the first circuit 100. Optionally, the other end of the control switch Switch5 can also be connected to a second circuit L5. The second circuit L5 is the second circuit 200 connected to the capacitor CC5.

The control switch 400 is mainly configured to control two different working modes of the crosstalk effect test circuit 10. One working mode is that when all the control switches 400 in the crosstalk effect test circuit 10 are turned off, the N second circuits 200 and the N capacitors 300 have no the influence of the crosstalk effect on the interfered signal. The other working mode is that when some or all of the control switches 400 in the crosstalk effect test circuit 100 are turned on, the interfered signal is interfered by the crosstalk effect. The comparison of the rise time and the fall time of the interfered signal outputted by the first circuit 100 at the two working modes can reflect the change of the interfered signal when being interfered by the crosstalk effect.

Optionally, in the other working mode, the interference between different second circuits 200 and the first circuit 100 can be determined by turning on different control switches 400. For example, the control switch SwitcM is turned on, and other control switches, such as the control switch Switch2, the control switch Switch3, the control switch Switch4, and the control switch Switch5, are turned off. In this case, the crosstalk effect existing between the second circuit L1 and the first circuit L0 can be obtained according to the differences of the rise time and the fall time of the interfered signal at the two working modes.

The crosstalk effect test circuit 10 provided by this embodiment adds the control switch 400 on the basis of the crosstalk effect test circuit 10 provided by embodiment I or embodiment II. The control switch 400 can control the crosstalk effect test circuit 10 to enter the two different working modes. Moreover, by means of the turn-on and turn-off of the control switch 400, the crosstalk effects between different second circuits 200 and the first circuit 100 can be tested, or the crosstalk effects between a plurality of second circuits 200 and the first circuit 100 can be tested. The crosstalk effect test circuit 10 provided by this embodiment makes it more convenient to change a test mode when researchers perform a crosstalk effect test, such that the crosstalk effect test results are richer and more targeted.

The method for testing crosstalk effect provided by embodiment IV of the present disclosure is applied to the terminal device. The terminal device is a device, such as a laboratory-specific server, a computer, or a mobile phone.

Figure 4:
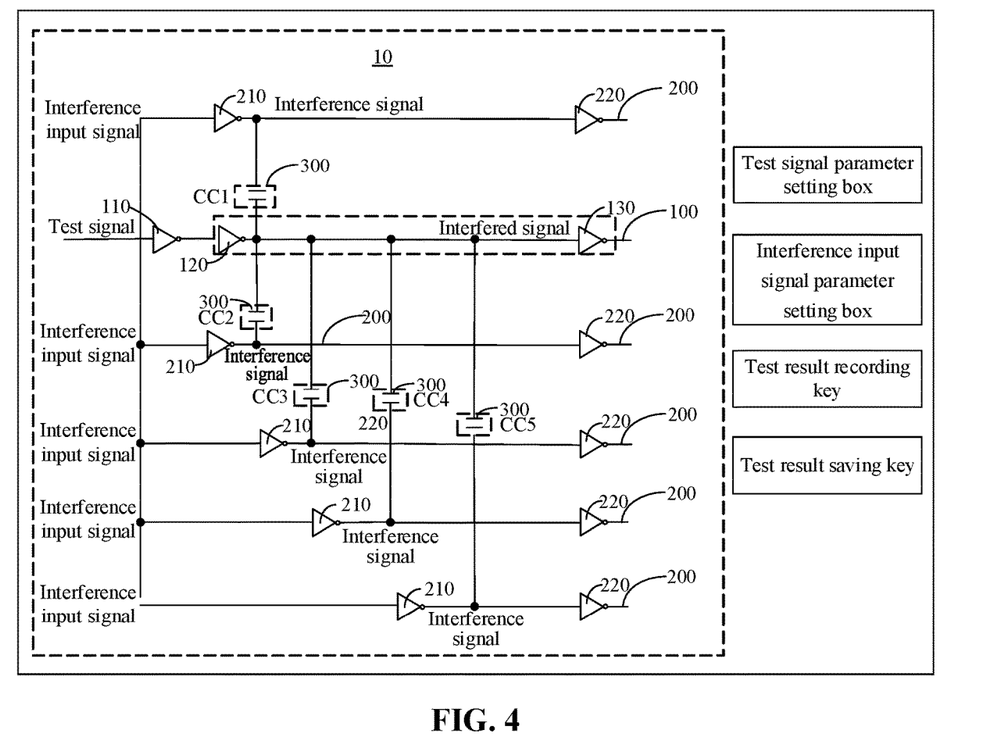
FIG. 4 is a schematic view of an application scenario of a method for testing crosstalk effect provided by embodiment IV of the present disclosure.

FIG. 4 is a schematic view of an application scenario of a method for testing crosstalk effect provided by the present disclosure. The terminal device can simulate the crosstalk effect of the integrated circuit under test to generate the crosstalk effect test circuit 10. Various input boxes and keys such as a test signal parameter setting box, an interference input signal parameter setting box, a test result recording key, and a test result saving key shown in FIG. 4 can further be configured on the terminal device. The researcher can set a parameter of the test signal and a parameter of the interference input signal on the terminal device, then input the test signal and the interference input signal into the crosstalk effect test circuit 10 by controlling keys to obtain the interfered signal, and analyze the interfered signal and then determine a test result of the crosstalk effect of the integrated circuit under test.

Figure 5:
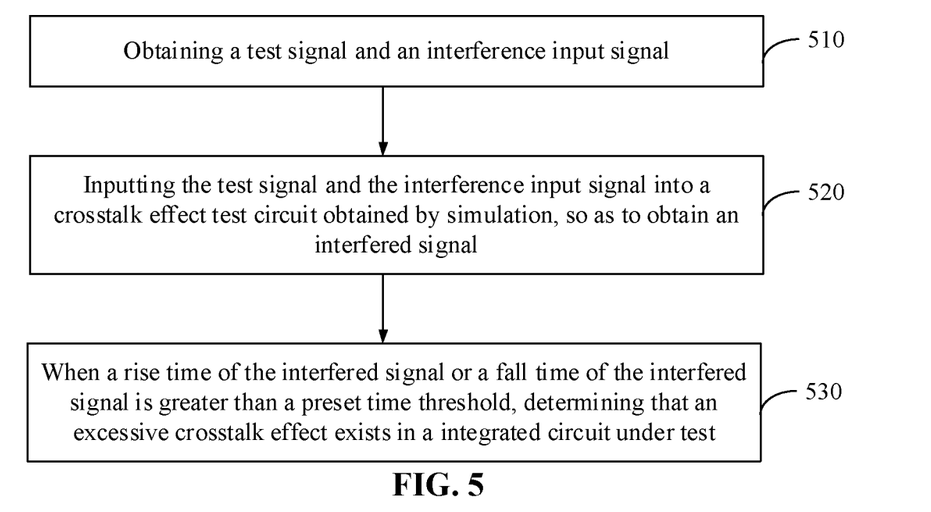
FIG. 5 is a schematic flowchart view of a method for testing crosstalk effect provided by embodiment IV of the present disclosure.

Referring to FIG. 5, the method for testing crosstalk effect includes the following steps.

In S510, the test signal and the interference input signal are obtained.

The test signal and the interference input signal can be set by a worker on the terminal device. Preferably, the interference input signal can be an approximate ideal pulse signal. That is, the rise time and the fall time of the interference input signal can be 20 ps.

In S520, the test signal and the interference input signal are inputted into the crosstalk effect test circuit obtained by simulation, so as to obtain the interfered signal.

The crosstalk effect test circuit obtained by simulation is the crosstalk effect test circuit 10. The crosstalk effect test circuit 10 can be a test circuit as described in embodiment I, or embodiment II, or embodiment III. The crosstalk effect test circuit 10 is a simulation circuit provided on the terminal device.

When the terminal device is in the crosstalk effect test circuit 10 that is obtained by simulation as described in embodiment I, the terminal device can simulate the first circuit 100 according to the first signal circuit, and simulate the N second circuits 200 according to the N second signal circuits. The terminal device then obtains the coupling capacitance values between the second signal circuits and the first signal circuit, and creates the capacitors 300 according to the coupling capacitance values. Specifically, the terminal device selects the N capacitors to be connected to the crosstalk effect test circuit according to the capacitance values of the coupling capacitors between the first signal circuit and the N second signal circuits.

When the terminal device is in the crosstalk effect test circuit 10 that is obtained by simulation as described in embodiment II, the first circuit 100 includes the inverting unit 110, the first driving unit 120, and the first load unit 130. The input end of the inverting unit 110 is configured to receive the test signal, perform inverting processing on the test signal and then output the inverted test signal. The input end of the first driving unit 120 is connected to the output end of the inverting unit 110, and the output end of the first driving unit 120 is configured to output the interfered signal. The input end of the first load unit 130 is connected to the output end of the first driving unit 120.

The second circuit 200 includes the second driving unit 210 and the second load unit 220. The input end of the second driving unit 210 is configured to receive the interference input signal, and the output end of the second driving unit 220 is configured to output the interference signal.

The input end of the second load unit 220 is connected to the output end of the second driving unit 210. One pole plate of the capacitor 300 is connected to the output end of the second driving unit 210 and connected to the input end of the second load unit 220, and the other pole plate of the capacitor 300 is connected to the first circuit 100.

When the terminal device is in the crosstalk effect test circuit 10 that is obtained by simulation as described in embodiment III, the terminal device creates the control switches 400. One end of each control switch 400 is connected to one pole plate of the capacitor 300, and the other end of the control switch 400 is connected to the first circuit 100 or the second circuit 200. The control switch 400 is connected in series to the capacitor 300.

The crosstalk effect test circuit 10 includes the N second circuits 200, can input the interference input signal to each second circuit 200, and can also input the interference input signal to some of the N second circuits 200. If the method provided by this embodiment is applied to the crosstalk effect test circuit 10 provided by embodiment III, when the control switch 400 is turned on, the interference signal outputted by the second circuit 200 causes interference with the interfered signal of the first circuit 100. When the control switch 400 is turned off, the second circuit 200 does not generate signal interference with the first circuit 100.

In S530, when the rise time of the interfered signal or the fall time of the interfered signal is greater than the preset time threshold, it is determined that the excessive crosstalk effect exists in the integrated circuit under test.

The longer the rise time or the fall time of the interfered signal is, it is proved that the more serious the crosstalk effect existing in the integrated circuit under test is. The preset time threshold can be set according to an actual condition. The preset time threshold corresponding to different integrated circuit under tests can also be different. If the preset time threshold is 1 nanosecond, when the rise time or the fall time of the interfered signal is greater than 1 nanosecond, it is determined that the excessive crosstalk effect exists in the integrated circuit under test.

The terminal device can store the rise time and the fall time of a plurality of interfered signals. A storage mode can be selected according to an actual requirement, and the present disclosure does not define this.

Figure 6:
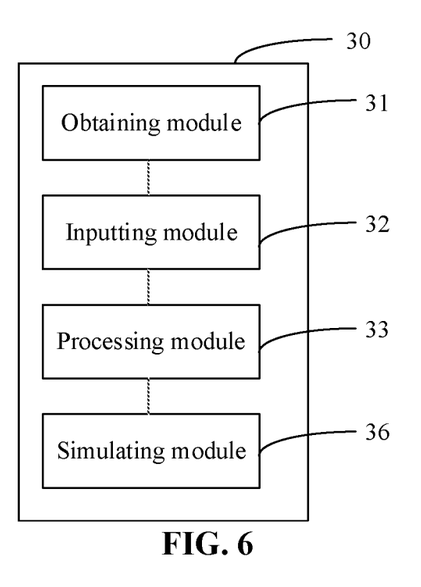
FIG. 6 is a schematic view of an apparatus for testing crosstalk effect provided by embodiment V of the present disclosure.

Referring to FIG. 6, embodiment V of the present disclosure provides a crosstalk effect test apparatus 30, including an obtaining module 31, an inputting module 32, and a processing module 33.

The obtaining module 31 is configured to obtain the test signal and the interference input signal. The test signal and the interference input signal are pulse signals of the same phase, and the rise time and the fall time of the interference input signal both are preset times.

The inputting module 32 is configured to input the test signal and the interference input signal into the crosstalk effect test circuit obtained by simulation, so as to obtain the interfered signal. The crosstalk effect test circuit includes the first circuit, the N second circuits, and the N capacitors. The first circuit is configured to simulate the interfered first signal circuit in the integrated circuit under test, the input end of the first circuit is configured to receive the test signal, and the output end of the first circuit is configured to output the interfered signal. The N second circuits are configured to simulate the N second signal circuits that interfere with the first signal circuit in the integrated circuit under test, N is an integer greater than 0, the input end of each second circuit is configured to receive the interference input signal, and the output end of the second circuit is configured to output the interference signal. One pole plate of each of the N capacitor is connected to the first circuit, the other pole of the capacitor is connected to the second circuit, and the capacitance value of the capacitor is determined according to the measured coupling capacitance value between the second signal circuit and the first signal circuit.

The processing module 33 is configured to determine that the excessive crosstalk effect exists in the integrated circuit under test when the rise time of the interfered signal or the fall time of the interfered signal is greater than the preset time threshold.

The crosstalk effect test apparatus 30 further includes:

a simulating module 34, configured to simulate the first circuit according to the first signal circuit, simulate the N second circuits according to the N second signal circuits, obtain the coupling capacitance values between the second signal circuits and the first signal circuit, and create the capacitors according to the coupling capacitance values.

The first circuit includes: the inverting unit, the input end of the inverting unit being configured to receive the test signal, perform inverting processing on the test signal and then output the inverted test signal; the first driving unit, the input end of the first driving unit being connected to the output end of the inverting unit, and the output end of the first driving unit being configured to output the interfered signal; and the first load unit, the input end of the first load unit being connected to the output end of the first driving unit.

The second circuit includes: the second driving unit, the input end of the second driving unit being configured to receive the interference input signal, and the output end of the second driving unit being configured to output the interference signal; and the second load unit, the input end of the second load unit being connected to the output end of the second driving unit. One pole plate of the capacitor is connected to the output end of the second driving unit and connected to the input end of the second load unit, and the other pole plate of the capacitor is connected to the first circuit.

The simulating module 34 is further configured to create the control switches. One end of each control switch is connected to one pole plate of the capacitor, and the other end of the control switch is connected to the first circuit or the second circuit. The control switch is connected in series to the capacitor.

The simulating module 34 is further configured to select the N capacitors to be connected to the crosstalk effect test circuit to simulate the N second circuits according to the capacitance values of the coupling capacitors between the first signal circuit and the plurality of second signal circuits.

Figure 7:
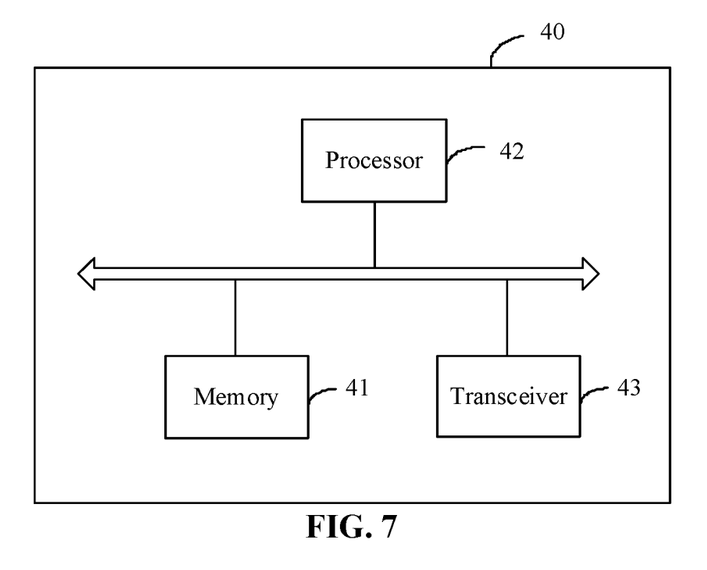
FIG. 7 is a schematic view of a terminal device provided by embodiment VI of the present disclosure.

Referring to FIG. 7, embodiment VI of the present disclosure further provides a terminal device 40, including a memory 41, a processor 42, and a transceiver 43. The memory 41 is configured to store an instruction. The transceiver 43 is configured to communicate with other devices. The processor 42 is configured to execute the instruction stored in the memory 41, such that the terminal device 40 implements the method for testing crosstalk effect provided by embodiment IV above. The specific implementations and the technical effect are similar and are not described here again.

The present disclosure further provides a computer-readable storage medium. The computer-readable storage medium stores a computer executable instruction. When the instruction is executed, the computer executable instruction is executed by the processor and configured to implement the method for testing crosstalk effect provided by embodiment IV above. The specific implementations and the technical effect are similar and are not described here again.

The present disclosure further provides a computer program product, including a computer program. When the computer program is executed by the processor, the method for testing crosstalk effect provided by embodiment IV above is implemented. The specific implementations and the technical effect are similar and are not described here again.

It should be noted that the aforementioned computer-readable storage medium can be a Read Only Memory (ROM), a Programmable Read-Only Memory (PROM), an Erasable Programmable Read-Only Memory (EPROM), an Electrically Erasable Programmable Read-Only Memory (EEPROM), a Ferromagnetic Random-Access Memory (FRAM), a flash memory, a magnetic surface memory, an optical disk, or a Compact Disc Read-Only Memory (CD-ROM). The computer-readable storage medium can also be any electronic device including one or any combination of the aforementioned memories, such as a mobile phone, a computer, a tablet device, or a personal digital assistant.

It should be noted that the terms "include", "comprise" or any other variants thereof are intended to cover non-exclusive inclusion, such that a process, method, article or device including a series of elements includes not only those elements but also other elements that are not explicitly listed, or further includes elements inherent to the process, method, article, or apparatus. Under the condition of no more limitations, an element defined by the statement "including one . . . " does not exclude that there are other identical elements in the process, method, article or apparatus including the element.

The sequence numbers of the aforementioned embodiments of the present disclosure are merely for description and do not indicate the preference of the embodiments.

By means of the description of the foregoing implementations, a person skilled in the art can clearly know that the method according to the foregoing embodiments can be implemented by software and a necessary general-purpose hardware platform, and can also be implemented by the hardware, but in many cases, the former is a better implementation. Based on such an understanding, the technical solutions of the present disclosure or a part thereof contributing to the prior art may be essentially embodied in the form of a software product. The computer software product is stored in one storage medium (such as a ROM/RAM, a floppy disk, or an optical disc) and includes several instructions such that one computer device (which may be a mobile phone, a computer, a server, a conditioner, a network device, and the like) implements the method according to the embodiments of the present disclosure.

The present disclosure is described with reference to flowcharts and/or block diagrams of methods, devices (systems), and computer program products of the embodiments of the present disclosure. It should be understood that a computer program instruction is configured to implement each flow and/or block in the flowcharts and/or block diagrams, and the combination of flows/blocks in the flowcharts and/or block diagrams. These computer program instructions may be provided to a universal computer, a special computer, an embedded processor or processors of other programmable data processing devices to generate a machine such that an apparatus for implementing the functions specified in one or more flows in the flowcharts and/or one or more blocks in the block diagrams is generated through the instructions executed by the computer or the processors of other programmable data processing devices.

These computer program instructions may also be stored in a computer readable memory that can direct the computer or other programmable data processing devices to work in a particular manner such that the instruction stored in the computer readable memory generates a product including an instruction apparatus, which implements the functions specified in one or more flows in the flowchart and/or one or more blocks in the block diagram.

These computer program instructions may also be loaded in a computer or other programmable data processing devices such that a series of operation steps are executed on the computer or other programmable data processing devices to generate computer implemented processing, and thus, the instruction executed on the computer or other programmable data processing devices provides the steps for implementing the functions specified in one or more flows in the flowchart and/or one or more blocks in the block diagram.

The above are merely preferred embodiments of the present disclosure and thus do not limit the patent scope of the present disclosure. Any equivalent structure or equivalent process transformation made by using the content of the description and the accompanying drawings of the present disclosure, or any direct or indirect application of the present disclosure in other related technical fields shall all be included in the scope of patent protection of the present disclosure.

What is claimed is:

1. A method for testing crosstalk effect, comprising:
obtaining a test signal and an interference input signal;
inputting the test signal and the interference input signal into a crosstalk effect test circuit obtained by simulation, so as to obtain an interfered signal, wherein the crosstalk effect test circuit comprises a first circuit, N second circuits, and N capacitors, the first circuit is configured to simulate an interfered first signal circuit in a integrated circuit under test, an input end of the first circuit is configured to receive the test signal, and an output end of the first circuit is configured to output the interfered signal; the N second circuits are configured to simulate N second signal circuits that interfere with the first signal circuit in the integrated circuit under test, N is an integer greater than 0 and less than or equal to 5, an input end of each second circuit is configured to receive the interference input signal, and an output end of each second circuit is configured to output an interference signal; and
one pole plate of each of the N capacitors is connected to the first circuit, the other pole plate of the capacitor is connected to the second circuit, and a capacitance value of the capacitor is determined according to a measured coupling capacitance value between the second signal circuit and the first signal circuit; and
when a rise time of the interfered signal or a fall time of the interfered signal is greater than a preset time threshold, determining that an excessive crosstalk effect exists in the integrated circuit under test.

2. The method of claim 1, further comprising:
simulating the first circuit according to the first signal circuit, and simulating the N second circuits according to the N second signal circuits; and obtaining the coupling capacitance values between the second signal circuits and the first signal circuit, and creating the capacitors according to the coupling capacitance values.

3. The method of claim 2, wherein the first circuit comprises:
an inverting unit, wherein an input end of the inverting unit is configured to receive the test signal, perform inverting processing on the test signal and then output an inverted test signal;
a first driving unit, wherein an input end of the first driving unit is connected to an output end of the inverting unit, and an output end of the first driving unit is configured to output the interfered signal; and
a first load unit, wherein an input end of the first load unit is connected to the output end of the first driving unit.

4. The method of claim 2, wherein the second circuit comprises:
a second driving unit, wherein an input end of the second driving unit is configured to receive the interference input signal, and an output end of the second driving unit is configured to output the interference signal; and
a second load unit, wherein an input end of the second load unit is connected to the output end of the second driving unit; and
one pole plate of the capacitor is connected to the output end of the second driving unit and connected to the input end of the second load unit, and the other pole plate of the capacitor is connected to the first circuit.

5. The method of claim 1, further comprising:
creating control switches, wherein one end of each control switch is connected to one pole plate of the capacitor, the other end of the control switch is connected to the first circuit or the second circuit, and the control switch is connected in series to the capacitor.

6. The method of claim 1, wherein the test signal and the interference input signal are pulse signals of the same phase, and the rise time and the fall time of the interference input signal both are preset times.

7. The method of claim 1, further comprising:
selecting the N capacitors to be connected to the crosstalk effect test circuit according to the capacitance values of coupling capacitors between the first signal circuit and a plurality of second signal circuits, so as to simulate the N second circuits.

8. A terminal device, comprising a memory, a processor, and a transceiver, wherein the memory is configured to store an instruction, the transceiver is configured to communicate with other devices, and the processor is configured to execute the instruction stored in the memory, such that the terminal device executes the method for testing crosstalk effect of claim 1.

9. A non-transitory computer-readable storage medium having stored thereon computer executable instructions, and when the instructions are executed, a computer executes the method for testing crosstalk effect of claim 1.

10. A circuit for testing crosstalk effect, comprising:
a first circuit, configured to simulate an interfered first signal circuit in an integrated circuit under test, wherein an input end of the first circuit is configured to receive a test signal, and an output end of the first circuit is configured to output an interfered signal;
N second circuits, configured to simulate N second signal circuits that interfere with the first signal circuit in the integrated circuit under test, wherein N is an integer greater than 0 and less than or equal to 5, an input end of each second circuit is configured to receive an interference input signal, and an output end of each second circuit is configured to output an interference signal; and
N capacitors, wherein one pole plate of each capacitor is connected to the first circuit, the other pole plate of the capacitor is connected to the second circuit, and a capacitance value of the capacitor is determined according to a measured coupling capacitance value between the second signal circuit and the first signal circuit.

11. The circuit of claim 10, wherein the first circuit comprises:
an inverting unit, wherein an input end of the inverting unit is configured to receive the test signal, perform inverting processing on the test signal and then output an inverted test signal;
a first driving unit, wherein an input end of the first driving unit is connected to an output end of the inverting unit, and an output end of the first driving unit is configured to output the interfered signal; and
a first load unit, wherein an input end of the first load unit is connected to the output end of the first driving unit.

12. The circuit of claim 10, wherein the second circuit comprises:
a second driving unit, wherein an input end of the second driving unit is configured to receive the interference input signal, and an output end of the second driving unit is configured to output the interference signal; and
a second load unit, wherein an input end of the second load unit is connected to the output end of the second driving unit; and
one pole plate of the capacitor is connected to the output end of the second driving unit and connected to the input end of the second load unit, and the other pole plate of the capacitor is connected to the first circuit.

13. The circuit of claim 10, further comprising:
control switches, wherein one end of each control switch is connected to one pole plate of the capacitor, the other end of the control switch is connected to the first circuit or the second circuit, and the control switch is connected in series to the capacitor.

14. The circuit of claim 10, wherein the test signal and the interference input signal are pulse signals of the same phase, and the rise time and the fall time of the interference input signal both are preset times.

15. An apparatus for testing crosstalk effect, comprising:
a processor; and
a memory for storing instructions executable by the processor;
wherein the processor is configured to:
obtain a test signal and an interference input signal;
input the test signal and the interference input signal into a crosstalk effect test circuit obtained by simulation, so as to obtain an interfered signal, wherein the crosstalk effect test circuit comprises a first circuit, N second circuits, and N capacitors, the first circuit is configured to simulate an interfered first signal circuit in an integrated circuit under test, an input end of the first circuit is configured to receive the test signal, and an output end of the first circuit is configured to output the interfered signal; the N second circuits are configured to simulate N second signal circuits that interfere with the first signal circuit in the integrated circuit under test, N is an integer greater than 0 and less than or equal to 5, an input end of each second circuit is configured to receive the interference input signal, and an output end of each second circuit is configured to output an interference signal; and one pole plate of each of the N capacitors is connected to the first circuit, the other pole plate of the capacitor is connected to the second circuit, and a capacitance value of the capacitor is determined according to a measured coupling capacitance value between the second signal circuit and the first signal circuit; and determine that an excessive crosstalk effect exists in the integrated circuit under test when a rise time of the interfered signal or a fall time of the interfered signal is greater than a preset time threshold.

\* \* \* \* \*